UNITED STATES PATENT OFFICE.

BYRON B. GOLDSMITH, OF NEW YORK, N. Y.

PROCESS OF PRODUCING CONDENSATION PRODUCTS.

1,375,959.     Specification of Letters Patent.     Patented Apr. 26, 1921.

No Drawing.     Application filed July 28, 1917. Serial No. 183,320.

*To all whom it may concern:*

Be it known that I, BYRON B. GOLDSMITH, a citizen of the United States, residing at No. 19 East 74th St., in the city, county, and State of New York, have invented certain new and useful Improvements in Processes of Producing Condensation Products; and I do hereby declare the following to be a full, clear, and exact description of the invention, such as will enable others skilled in the art to which it appertains to make and use the same.

This invention relates to a method of producing condensation products from a phenol and a substance containing a reactive methylene group. The invention also covers the composition of matter produced by precipitation in the manner about to be described. A number of patents have issued in which formaldehyde or trioxymethylene is brought into reaction with phenol and patents have been granted to me for producing these products by reacting upon phenol with hexamethylene tetramin as well as with the formaldehyde compounds of amins. In all of these processes an intial resinous condensation product is formed which on further heating is transformed into an insoluble and infusible final product.

These condensation products have extensive uses in the arts for molding under heat and pressure as substitutes for hard rubber, celluloid, etc., and in preparing the material for molding it is desirable to heat the mass long enough and at a sufficiently high temperature to carry the condensation as far as possible before molding.

Considerable difficulty is encountered in this heating of the initial condensation product due to the fact that the reaction which is taking place liberates considerable heat, with the result that there is a great tendency for it to proceed too rapidly. In consequence of this the material blows to a spongy mass or reaches the insoluble state, or both. In other words, the reaction is very difficult to control.

In order that the matter may be more thoroughly understood, I will give an example of the trouble encountered in making these substances. Take for instance the reaction between phenol and hexamethylene tetramin. If these two are heated together on the water bath the crystals of hexamethylene teramin gradually disappear in the phenol and there is soon produced the initial amber-colored resinous condensation product. When it is desired to heat this higher than water bath temperature in order to produce still further condensation and bring it nearer the point where it is right for molding it is found that when the temperature gets a little above 105° C. and remains there for a time there is a sudden evolution of gas and the temperature of the mass runs up almost instantly to 180° and a spongy material is the result.

Now I have discovered that it is possible to control the reaction and carry it out at a given predetermined temperature which may be higher than 105° C. and to produce a mass all of which has been carried to a certain point in the reaction and no further. I have found that if I use a solvent of the initial condensation product, which has a sufficiently high boiling point and in which the resin becomes insoluble after reaching a certain condensation, I can perfectly control the reaction. Not only can I keep the temperature of the mass constant, but at a certain point the condensation product all separates out of the solvent and it can be worked further.

Take, for instance, in the example I have mentioned where hexamethylene tetramin and phenol are allowed to react, if I add xylol either at the beginning before heating or after the reaction has proceeded for a while, I can heat the material up as high as 155 to 160 degrees, thus carrying the reaction further than can be done at the water bath temperature, and one great advantage is that as soon as the reaction has gone far enough to produce a condensation product which is no longer soluble in xylol the whole mass separates out leaving the xylol above, which can be poured off and used over again, and the resin is ready for further working. I can have the condensation product separate from the xylol in different conditions as desired, either as a solid mass or as a pulverulent precipitate. It all depends upon the quantity of xylol which is used as to how the condensation product will come out of the solution. This product is very different, in the way it acts in molding from the initial product. It can be softened on heating in the mold and does not get too liquid for molding, whereas the initial condensation product is molded with great difficulty on account of it getting very fluid and giving off much gas. This process therefore gives a sure method of carrying the condensation just to a certain desired point and there is no danger of going further; and also no danger of not going far enough, as the moment all has gone just to the right point the product separates out. Another advantage is that if by chance either of the reagents was added in the wrong amount, only the right amount will react and the balance will stay in solution in the xylol.

To give an example of proportions, in case I desire to have the condensation product separate out as a resinous mass and not in pulverulent form, I take 40 grams of phenol, 10 grams of hexamethylene tetramin and 50 grams of xylol. On heating this mixture in a reflux condenser, and slowly raising the temperature, I can go up to about 165° C. when the condensation product separates as a resinous mass and the xylol can be poured off to be used over again if desired. If large excess of xylol is used, the material separates out as a pulverulent precipitate which can be molded.

It will be at once apparent that I have developed a new method of making these resinous condensation products which can be further extended by experimenting with other solvents and mixtures of solvents. If the resin is soluble at one stage in a certain solvent and is insoluble after the reaction has proceeded further the resin will separate out when the reaction has reached that point, and when it is remembered how difficult it is to carry out this reaction with hexamethylene tetramin and phenol without encountering all the troubles mentioned heretofore, it is seen that by the new method we will be able to choose solvents or mixtures of solvents by means of which we can carry the reaction almost to any point desired. The following is an example of a mixture of solvents. If in the example given above I use 10 grams more of phenol than required for the reaction, this excess of phenol acts in conjunction with the xylol as a solvent for the resin condensation product and permits me to carry the heat up to about 180° before the resin separates out. Instead of heating the materials in a reflux condenser it can be done to great advantage under pressure.

While I have mentioned liquid solvents, it is within the scope of my invention to use a solid solvent, either alone or in conjunction with a liquid solvent. Of course, if the solid solvent is used alone, it must melt to a liquid on being heated. Although I have described the use of my invention with the resin made from hexamethylene tetramin and phenol, it is applicable to any of the resinous condensation products made from phenol and a body having a reactive methylene group. When phenol and formaldehyde are used the initial condensation product can be made first and this is dissolved in the solvent and heated further. Or the initial condensation product can be produced in solution by dissolving phenol in the solvent and passing formaldehyde gas into the solution. This can be done under pressure. In like manner, when the formaldehyde compound of an amin is used, the phenol and amin are dissolved in the solvent and formaldehyde gas passed in. Of course, trioxymethylene can be used instead of formaldehyde in either of the above reactions. In all these cases condensing agents may be used, as is well understood.

When I use the term phenol in this specification and claims, I refer not only to carbolic acid and cresols but to any other phenolic bodies acting similarly for the purpose of this invention; and where I refer to a solvent in my claims, I desire to be understood as meaning either a simple substance or a mixture of substances having a solvent power.

Although I have mentioned the use of these products for molding, they need not be used in this way. The condensation may have been carried so far that the substances can be used as they are by working them on a lathe into the desired shape, or the resin may have been allowed to deposit into a form by carrying on the reaction in suitably shaped receptacles. It is also possible to heat the deposited resin either in forms or in mass to carry the condensation to the final stage. It is, of course, understood that fillers of all kinds can be added to the material at any stage of the manufacture which will allow of their introduction.

What I claim is—

1. The process of forming a resinous condensation product from a phenol and a body having a reacting methylene group which consists in producing the initial condensation product in solution and applying heat until precipitation takes place.

2. The process of converting the initial resinous condensation product which has been made from a phenol and a body having a reacting methylene radical into a substance more viscous when heated, which consists in dissolving the initial condensation product in a solvent and raising the temperature until precipitation takes place.

3. The process of forming a resinous condensation product from a phenol and a body having a reacting methylene group which consists in producing the initial condensation product in solution in xylol and applying heat until precipitation takes place.

4. The process of forming a resinous condensation product which consists in heating phenol and hexamethylene tetramin in the presence of a solvent for the initial condensation product and raising the temperature until precipitation takes place.

5. The process of forming a resinous condensation product which consists in heating phenol and hexamethylene tetramin in the presence of xylol and raising the temperature until precipitation takes place.

6. The process of heating an initial condensation product in solution and raising the temperature until precipitation takes place.

7. The process of heating an initial condensation product in solution in xylol and raising the temperature until precipitation takes place.

8. The process of heating an initial condensation product in solution in a mixture of xylol and phenol and raising the temperature until precipitation takes place.

9. The process of converting an initial condensation product into a resin-like product fit for molding which consists in heating the same while dissolved in a suitable solvent until precipitation takes place.

10. As a novel composition of matter, the precipitate formed by heating a solution of a phenol and a body having a reacting methylene group until the substances in solution have passed beyond the condition of initial condensation.

In testimony whereof, I affix my signature.

BYRON B. GOLDSMITH.